(12) United States Patent
Graney, IV et al.

(10) Patent No.: US 12,545,847 B2
(45) Date of Patent: Feb. 10, 2026

(54) NATURAL GAS SYSTEM FOR PROCESSING AND DELIVERY

(71) Applicants: Patrick C. Graney, IV, Charleston, WV (US); Gouverneur C. M. Graney, Charleston, WV (US); Peter Morcheid, Charleston, WV (US)

(72) Inventors: Patrick C. Graney, IV, Charleston, WV (US); Gouverneur C. M. Graney, Charleston, WV (US); Peter Morcheid, Charleston, WV (US)

(73) Assignee: Nacelle Logistics LLC, Charleston, WV (US)

( * ) Notice: Subject to any disclaimer, the term of this patent is extended or adjusted under 35 U.S.C. 154(b) by 277 days.

(21) Appl. No.: 18/224,273

(22) Filed: Jul. 20, 2023

(65) Prior Publication Data
US 2025/0027004 A1 Jan. 23, 2025

Related U.S. Application Data

(60) Provisional application No. 63/391,045, filed on Jul. 21, 2022.

(51) Int. Cl.
*C10L 3/10* (2006.01)
*B01D 46/00* (2022.01)
(Continued)

(52) U.S. Cl.
CPC .......... *C10L 3/101* (2013.01); *B01D 46/0031* (2013.01); *B01D 46/0041* (2013.01); *B01D 46/0087* (2013.01); *B01D 46/4245* (2013.01); *B01D 46/444* (2013.01); *B01D 46/446* (2013.01); *B01D 46/448* (2013.01);
(Continued)

(58) Field of Classification Search
None
See application file for complete search history.

(56) References Cited

U.S. PATENT DOCUMENTS

| 4,542,774 A | 9/1985 | Stavlo |
| 5,884,675 A | 3/1999 | Krasnov |

(Continued)

FOREIGN PATENT DOCUMENTS

| CA | 3021326 | 2/2019 |
| WO | WO2014197969 | 12/2014 |

*Primary Examiner* — Gabriel E Gitman
(74) *Attorney, Agent, or Firm* — Kean Miller LLP; Robert Devin Ricci; Taylor Dunne

(57) ABSTRACT

A natural gas processing system is mounted on a mobile platform that is transported to a natural gas source, such as a well. The system supplies natural gas through multiple hose reels to operate multi-fuel engines for well field equipment such as pumps, compressors, and trucks. A coalescing filter removes contaminants from the natural gas. A generator powered by the natural gas supplies process electricity. A process control monitors and controls the natural gas processing system, including pressure, temperature, moisture, and flow sensors. A gas chromatograph will determine the chemical composition of the natural gas. A gas evacuation system removes gas from the hose reel assemblies in the event of an emergency. An emergency shutdown system will halt the process in the event of high liquid levels, a gas leak, fire, or gas composition out of specification.

34 Claims, 14 Drawing Sheets

(51) Int. Cl.
  *B01D 46/42* (2006.01)
  *B01D 46/44* (2006.01)
  *B01D 46/46* (2006.01)
  *B67D 7/84* (2010.01)
  *E21B 43/34* (2006.01)

(52) U.S. Cl.
  CPC .............. *B01D 46/46* (2013.01); *E21B 43/34* (2013.01); *B67D 7/845* (2013.01); *C10L 2290/56* (2013.01); *C10L 2290/567* (2013.01)

(56) References Cited

U.S. PATENT DOCUMENTS

| | | |
|---|---|---|
| 7,222,647 B2 | 5/2007 | Bingham |
| 7,568,507 B2 | 8/2009 | Farese |
| 7,575,672 B1 | 8/2009 | Gilmore |
| 8,069,710 B2 | 12/2011 | Dodd |
| 8,794,307 B2 | 8/2014 | Coquilleau |
| 9,371,831 B2 | 6/2016 | Moffitt |
| 9,482,388 B2 | 11/2016 | Murphy |
| 9,725,295 B2 | 8/2017 | McKay |
| 9,784,411 B2 | 10/2017 | Diggins |
| 9,815,683 B1 * | 11/2017 | Kalala .................. B67D 7/3218 |
| 10,018,027 B2 * | 7/2018 | Graney, IV ............. C10L 3/101 |
| 10,145,512 B2 | 12/2018 | Barker |
| 10,633,243 B2 | 4/2020 | Shock |
| 10,759,649 B2 | 9/2020 | Haile |
| 10,815,118 B2 | 10/2020 | Shock |
| 11,059,714 B2 | 7/2021 | Mawji |
| 11,255,485 B2 | 2/2022 | Poorman |
| 11,305,979 B2 | 4/2022 | Kadakia |
| 2011/0197988 A1 | 8/2011 | Van Vliet |
| 2015/0115589 A1 | 4/2015 | Thiessen |
| 2023/0123358 A1 | 4/2023 | Brown et al. |

\* cited by examiner

GAS CONDITIONING

HOSE REEL ASSEMBLY

HOSE REEL ASSEMBLY

HOSE REEL ASSEMBLY

RIGHT INLET HEADER

LEFT INLET HEADER

GAS EVACUATION SYSTEM

RIGHT GES HEADER

LEFT GES HEADER

INSTRUMENT AIR

NATURAL GAS SYSTEM FOR PROCESSING AND DELIVERY

INCORPORATION BY REFERENCE

Reference is hereby made to U.S. provisional application No. 63/391,045, filed on 21 Jul. 2022, entitled "Natural Gas System For Processing And Delivery" which is incorporated in its entirety for the teachings therein. Applicant hereby claims the benefit of the provisional filing date.

TECHNICAL FIELD

The presently disclosed technologies are directed to an apparatus and method that processes natural gas, and in particular, a transportable apparatus for final processing and safe delivery of natural gas that has been partially conditioned.

BACKGROUND

In natural gas fields, it is common practice to utilize natural gas at the wellhead to power vehicles, generators, pumps, compressors, or other equipment in the field. The natural gas is first processed to remove water and contaminants to condition the gas. The natural gas fuel is then delivered to the equipment by drum or pumped through a hose.

There are benefits for oil and gas companies to utilize natural gas on site to power engines, rather than trucking in diesel fuel or gasoline. Such engines, for example, would power drilling rigs or pump trucks during fracking. Using refined products, such as LNG or CNG, requires offsite processing, trucking and specialized equipment to deliver the fuel to the site. On site natural gas is source or field gas from a well or pipeline. The benefits include cost savings, employee safety, and less environmental disturbance.

The delivery methods currently in use are inefficient and time-consuming. There is no existing method or apparatus for fueling multiple pieces of equipment simultaneously. There is no existing apparatus that is self-contained and is transportable to anywhere in an oil or gas field. There is no safety provision in use to address the problem of accidental damage to delivery devices and subsequent leakage of gas. That leaves open the potential for fire with consequent damage to equipment and injury or loss of life of personnel.

Natural gas at the wellhead usually contains impurities such as carbon dioxide ($CO_2$), and hydrogen sulfide ($H_2S$). When dissolved in water, $CO_2$ is known as carbonic acid. Similarly, $H_2S$ becomes hydrosulfuric acid. Either of these acids will cause corrosion problems in pipelines and related equipment during transportation of natural gas.

Some limited processing of source natural gas is often carried out at the well site to remove contaminants. In addition to the $CO_2$ and $H_2S$, other gases such as nitrogen and carbon dioxide may be found in oil and gas wells. Solid impurities include sand and dirt from the reservoir; and scale and corrosion products from the piping. The wells produce a mixture of hydrocarbon gas, condensate, or oil; and water with dissolved minerals such as salt. The oil and gas is processed to separate these components.

A coalescing filter can purify natural gas by removing several natural liquids and condensates. The coalescing filter actively prevents corrosion in the gas driven equipment such as compressors, pumps, and generators, by removing contaminants such as water vapor and sulfur.

Natural gas engines maintain the best performance and require the least maintenance when utilizing a dry, consistent BTU gas delivered at an optimal pressure and temperature. Various engine manufacturers spec different ideal BTU ranges but typically 1000 to 1100 BTU is the prime range that balances horsepower required to do the job with engine and exhaust heat that causes engine and maintenance issues. It is not economical to develop a pipeline infrastructure to a well pad for pre-processed gas to power engines.

Accordingly, there is a need to provide a system that is trailer mounted and transportable to the wellhead site, and that is self-contained, and is capable of processing of source natural gas of varying quality found at the natural gas source.

There is a further need to provide a system of the type described, and that can remove water and particulate contaminants.

There is a still further need to provide a system of the type described, and that is capable of being powered by fuels recovered at the wellhead, and of providing fuels of adequate quality to power hybrid fuel engines on site.

There is a yet further need to provide a system of the type described, and that has multiple hose reels to supply gas to the vehicles and equipment.

There is another need to provide a system of the type described, and that for safety, has provision to evacuate gas from each reel in the system, There is still another need to provide a system of the type described, and that is capable of monitoring and controlling pressure, temperature, excess flow, and quality of gas through the system.

SUMMARY

In one aspect, a natural gas system for processing and delivery is used in connection with a natural gas source and raw source natural gas produced by the source. The natural gas system comprises a mobile platform adapted for being transported to the natural gas source. A source natural gas inlet is connected in fluid communication with the natural gas source.

At least one hose reel assembly is mounted on the mobile platform, and is connected in fluid communication with the natural gas inlet. The hose reel assembly includes a hose connected in fluid communication with the hose reel assembly. A natural gas outlet is connected in fluid communication with the hose. A liquid drain is juxtaposed with the mobile platform for discharging liquid contaminants from the natural gas processing system.

a gas evacuation system is mounted on the mobile platform, and is connected in fluid communication with the hose reel assembly. The gas evacuation system removes gas from the hose reel assembly in the event of an emergency.

In another aspect, a natural gas system for processing and delivery is used in connection with a natural gas source and raw source natural gas produced by the source. The natural gas system comprises a mobile platform adapted for being transported to the natural gas source. A source natural gas inlet is connected in fluid communication with the natural gas source. A liquid drain is juxtaposed with the mobile platform for discharging liquid contaminants from the natural gas processing system.

A contaminant filter is mounted on the mobile platform and is connected in fluid communication with the source natural gas inlet. The contaminant filter is connected to the liquid drain, and removes contaminants from the natural gas.

The contaminant filter allows passage of the natural gas through the contaminant filter.

An emergency shutdown valve is connected in fluid communication with the natural gas inlet. A process control is operatively connected to the natural gas processing system, and to the emergency shutdown valve, for controlling the natural gas processing system. At least one emergency shutdown control is operatively connected to the emergency shutdown valve and to the process control.

A heater is mounted on the mobile platform. The heater is connected in fluid communication with the natural gas inlet, for heating the natural gas.

At least one hose reel assembly is mounted on the mobile platform. The hose reel assembly is connected in fluid communication with the natural gas inlet. The hose reel assembly includes a hose connected in fluid communication with the hose reel assembly. A natural gas outlet is connected in fluid communication with the hose.

An inlet flow sensor is connected in fluid communication with the natural gas inlet, and measures the flow rate of the natural gas. The inlet flow sensor is operatively connected to the process control.

An inlet temperature sensor is connected in fluid communication with the natural gas inlet, and measures the temperature of the natural gas. The inlet temperature sensor is operatively connected to the process control.

An inlet pressure sensor is connected in fluid communication with the natural gas inlet, and measures the pressure of the natural gas. The inlet pressure sensor is operatively connected to the process control.

A gas evacuation system (GES) is mounted on the mobile platform. The gas evacuation system has a GES compressor connected in fluid communication with the hose reel assembly. The gas evacuation system pressurizes the hose reel assembly. The gas evacuation system also removes gas from the hose reel assembly in the event of an emergency. The gas evacuation system is operatively connected to the process control.

In yet another aspect, a natural gas system for processing and delivery is used in connection with a natural gas source and raw source natural gas produced by the source. The natural gas system comprises a mobile platform adapted for being transported to the natural gas source. A source natural gas inlet is connected in fluid communication with the natural gas source. A liquid drain is juxtaposed with the mobile platform for discharging liquid contaminants from the natural gas processing system.

A contaminant filter is mounted on the mobile platform and is connected in fluid communication with the source natural gas inlet. The contaminant filter is connected to the liquid drain, and removes contaminants from the natural gas. The contaminant filter allows passage of the natural gas through the contaminant filter.

A generator is mounted on the mobile platform, and is powered by the natural gas. The generator supplies process electricity to the natural gas system.

An emergency shutdown valve is connected in fluid communication with the natural gas inlet. A process control is operatively connected to the natural gas processing system, the generator, and the emergency shutdown valve. The process control controls the natural gas processing system. At least one emergency shutdown control is operatively connected to the emergency shutdown valve and to the process control.

A plurality of hose reel assemblies are mounted on the mobile platform. Each one of the plurality of hose reel assemblies is connected in fluid communication with the natural gas inlet. Each one of the hose reel assemblies includes a hose connected in fluid communication with the hose reel assembly. A natural gas outlet is connected in fluid communication with the hose. A motor-driven hose reel is provided for winding the hose.

Each hose reel assembly has an outlet flow sensor connected in fluid communication with the hose reel assembly. The outlet flow sensor measures the flow rate of natural gas through the hose reel assembly. The outlet flow sensor is operatively connected to the process control.

Each hose reel assembly has a flow control valve connected in fluid communication with the hose reel assembly and the gas evacuation system. The flow control valve is operatively connected to the outlet flow sensor and to the process control.

Each hose reel assembly has an outlet temperature sensor connected in fluid communication with the hose reel assembly. The outlet temperature sensor measures the temperature of natural gas in the hose reel assembly. The outlet temperature sensor is operatively connected to the process control.

Each hose reel assembly has an outlet pressure sensor connected in fluid communication with the hose reel assembly. The outlet pressure sensor measures the pressure of natural gas in the hose reel assembly. The outlet pressure sensor is operatively connected to the process control.

Each hose reel assembly has an excess flow valve connected in fluid communication with the hose reel assembly. The excess flow valve limits the flow of natural gas in an emergency.

A heater is mounted on the mobile platform, and is connected in fluid communication with the natural gas inlet, for heating the natural gas.

An inlet flow sensor is connected in fluid communication with the natural gas inlet, to measure the flow rate of the natural gas. The inlet flow sensor is operatively connected to the process control.

An inlet temperature sensor is connected in fluid communication with the natural gas inlet, to measure the temperature of the natural gas. The inlet temperature sensor is operatively connected to the process control.

An inlet pressure sensor is connected in fluid communication with the natural gas inlet, to measure the pressure of the natural gas. The inlet pressure sensor is operatively connected to the process control.

A gas evacuation system (GES) is mounted on the mobile platform. The gas evacuation system has a GES compressor connected in fluid communication with the hose reel assemblies. The gas evacuation system pressurizes the hose reel assemblies. The gas evacuation system also removes gas from the hose reel assemblies in the event of an emergency. The gas evacuation system is operatively connected to the process control.

In still another aspect, a method is disclosed for processing and delivery of natural gas, for use in connection with a natural gas source and raw source natural gas produced by the source. Transporting a mobile platform to the natural gas source. Connecting a source natural gas inlet in fluid communication with the natural gas source. Mounting at least one hose reel assembly on the mobile platform, and connecting the hose reel assembly in fluid communication with the natural gas inlet. Connecting a hose in fluid communication with the hose reel assembly. Connecting a natural gas outlet in fluid communication with the hose. Juxtaposing a liquid drain with the mobile platform, and discharging liquid contaminants from the natural gas processing system with the liquid drain. Mounting a gas evacuation system on the mobile platform, connecting the gas evacuation system in fluid communication with the hose reel assembly, and removing gas from the hose reel assembly with the gas evacuation system, in the event of an emergency.

These and other aspects, objectives, features, and advantages of the disclosed technologies will become apparent from the following detailed description of illustrative embodiments thereof, which is to be read in connection with the accompanying drawings.

Figure 1:
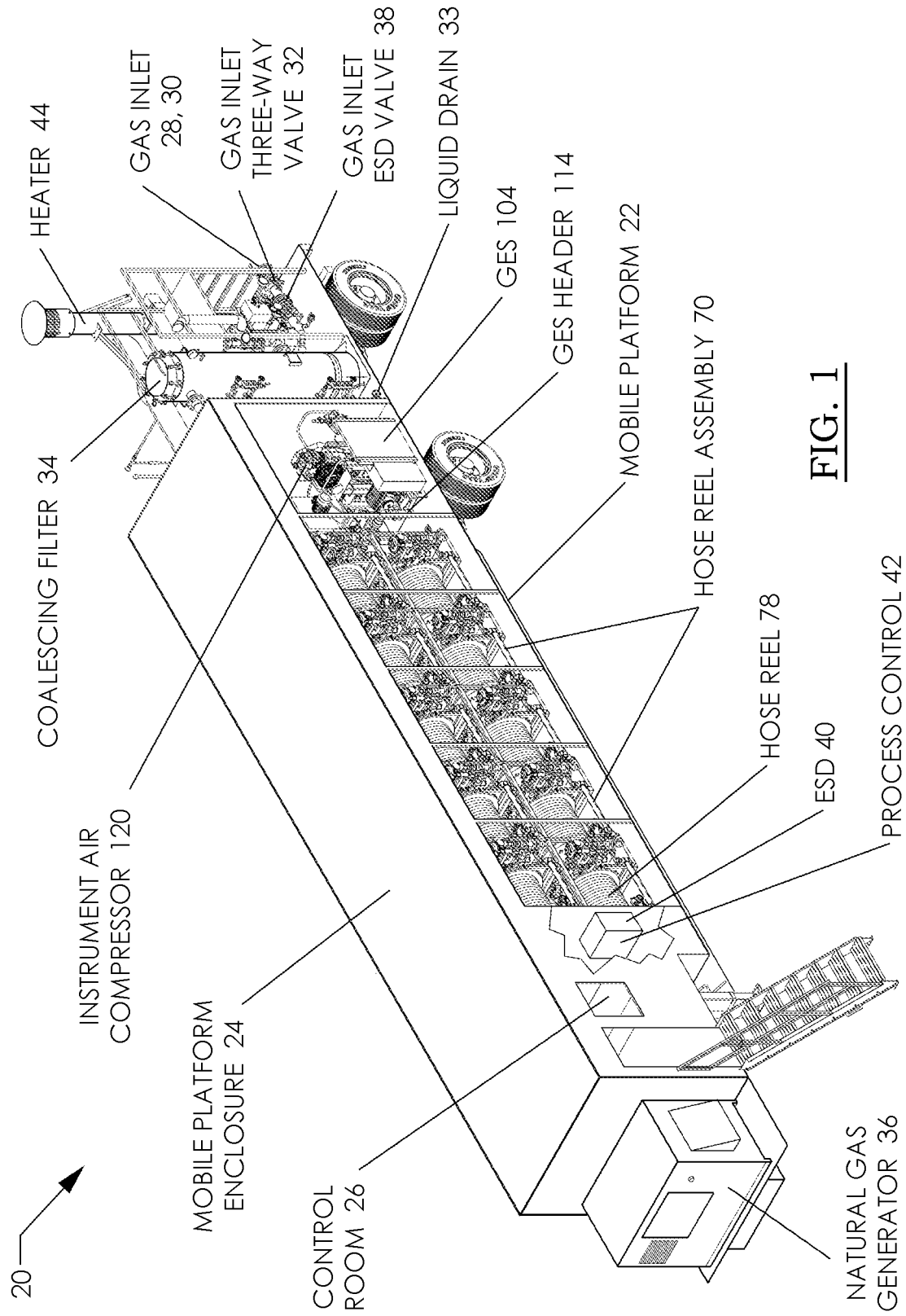
FIG. 1 is a left side perspective view of a Natural Gas System For Processing And Delivery constructed in accordance with the invention, as viewed from the left front.

It should be noted that the drawings herein are not to scale.

DETAILED DESCRIPTION

As used herein, a "processing assembly" or "processing system" refers to one or more devices used to condition or transform or process natural gas into another form or product.

As used herein, "natural gas" refers to raw source natural gas, or refined natural gas, or a gaseous fuel product in any stage of processing from the source to the finished product ready to ship. As used herein, "source gas" refers to raw natural gas or field gas as it comes directly from the wellhead.

As used herein, the term "process" refers to a procedure of moving or transporting a raw source natural gas, or a refined natural gas, or a gaseous fuel product, and converting the natural gas into a gaseous fuel product in any stage of processing. The "flow path" is the conduit through which the natural gas moves during the process. The natural gas moves in a "process direction" along the flow path, shown by arrows.

As used herein, "particulate" is defined as solid or liquid contaminant matter. A "particulate filter" removes entrained mists and oils. An example is a Xebec® coalescing type filter. This example is non-limiting.

As used herein, "water separator" is an apparatus that removes liquid or vapor water contaminants from the gas stream. An example is a Xebec® water separator liquid removal tank. This example is non-limiting.

As used herein, "pressure control valve" is a pressure regulator.

As used herein, "flame detector" is an instrument that senses a flame or heat signature indicating a fire due to gas leak or an electrical short in the system that is potentially dangerous. Flame detector includes an infrared sensor.

As used herein, "methane detector" is an instrument that senses a gas leak in the system that is potentially dangerous.

As used herein, "LEL" means "Lower Explosive Limit" and is defined as the lowest concentration of natural gas that is flammable or combustible. It is the minimum amount of gas that will catch fire or explode in the presence of an ignition source. If a gas concentration is less than the lower limit, there is insufficient gas for the mixture to ignite.

As used herein, "GES" means Gas Evacuation System. The GES will remove gas from all or some of the hoses in non-demand or ESD events, so as to prevent fire or explosion, and limit waste.

Describing now in further detail these exemplary embodiments with reference to the Figure as described above, the natural gas processing system is typically used to complete the processing of natural gas that is either raw, or has been partially conditioned from a well or a pipeline or other source. The system is then used to deliver the natural gas to an end user in a safe and efficient manner. The end users can be one or more tank trucks for transporting natural gas; vehicles using natural gas for fuel; or generators, pumps, compressors, and other equipment fueled by natural gas. Multiple end users can be serviced simultaneously.

Figure 2:
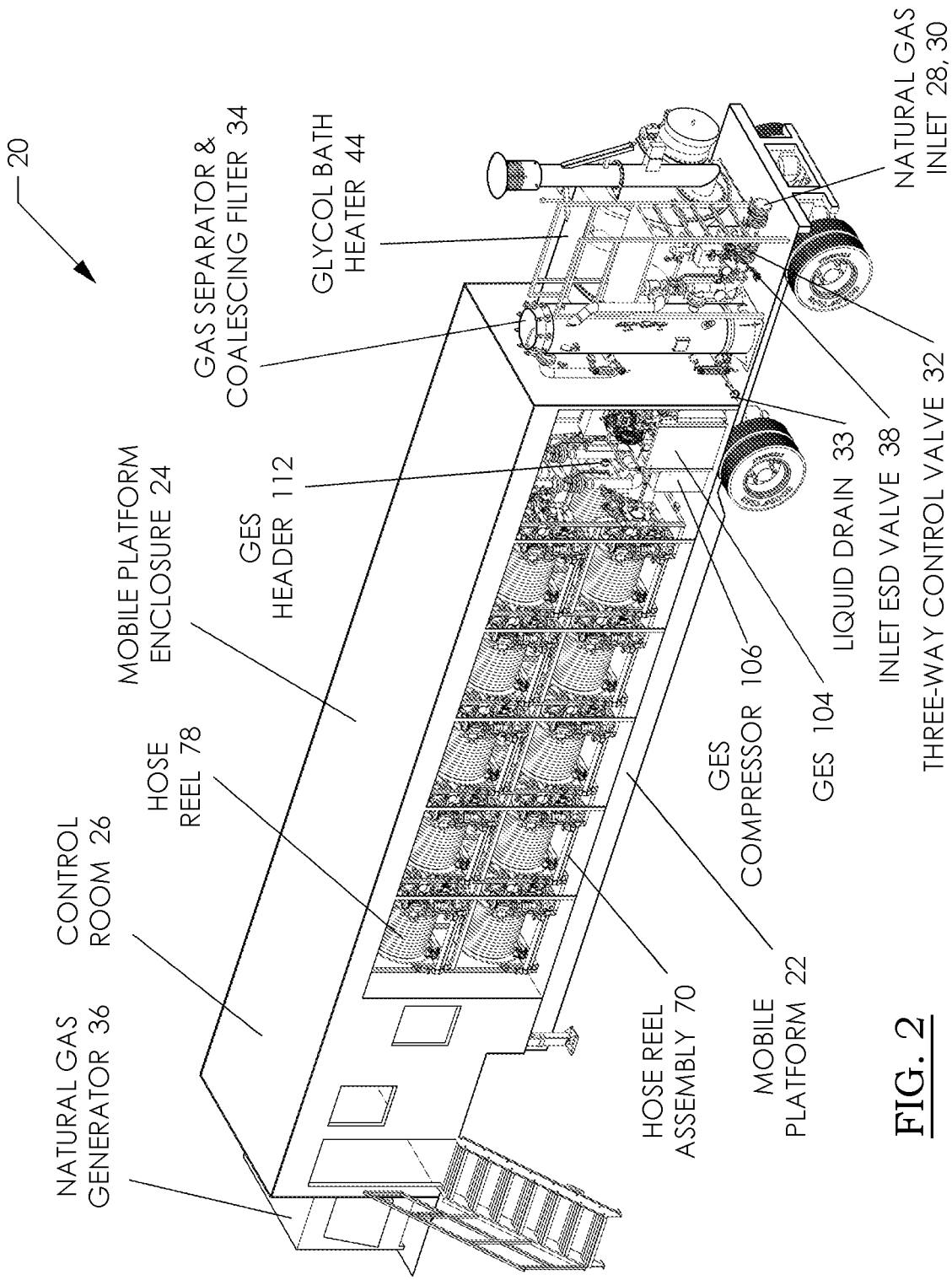
FIG. 2 is a left side perspective view of the Natural Gas System of FIG. 1, as viewed from the left rear.
Figure 3:
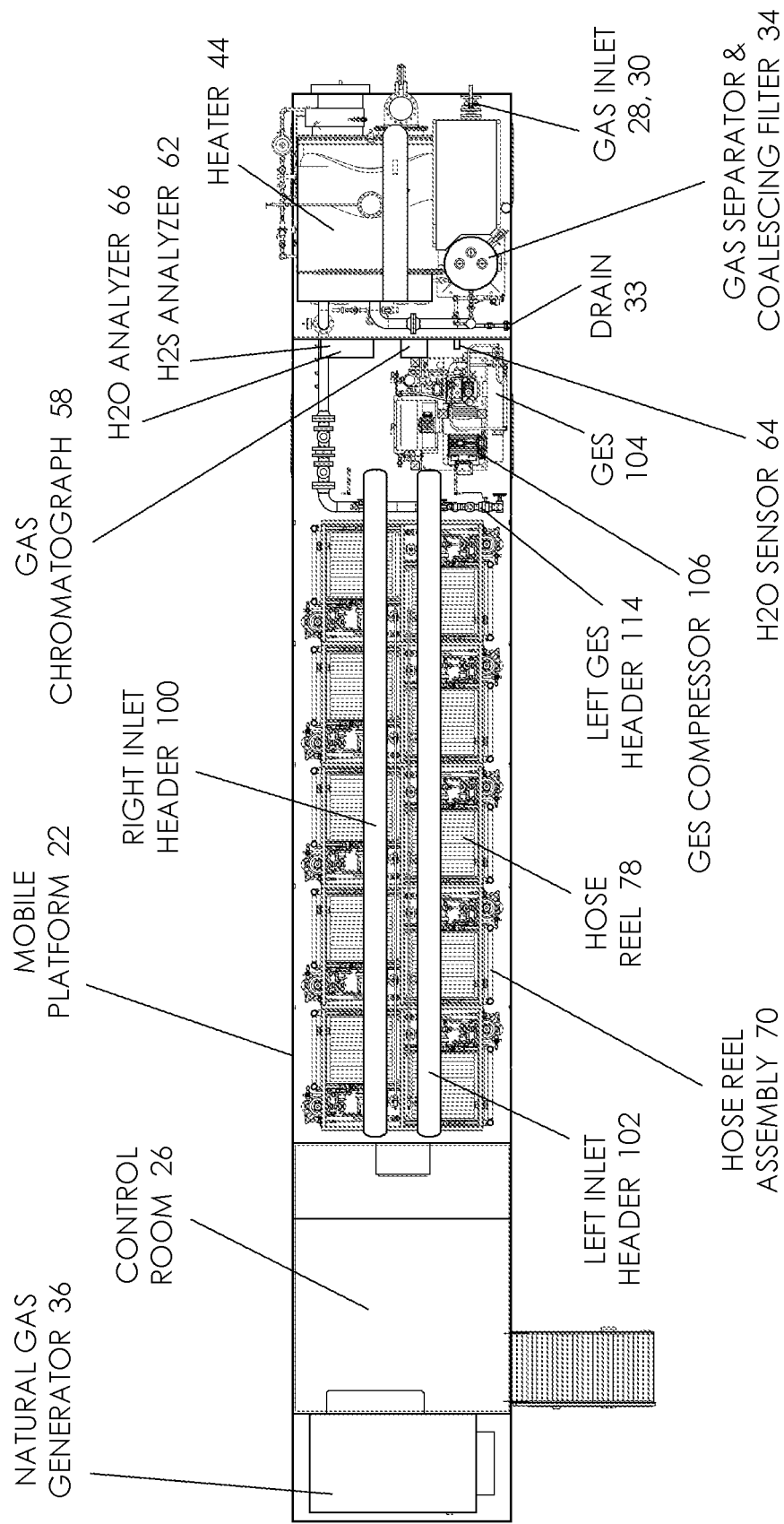
FIG. 3 is a top plan view of the Natural Gas System of FIG. 1.
Figure 4:
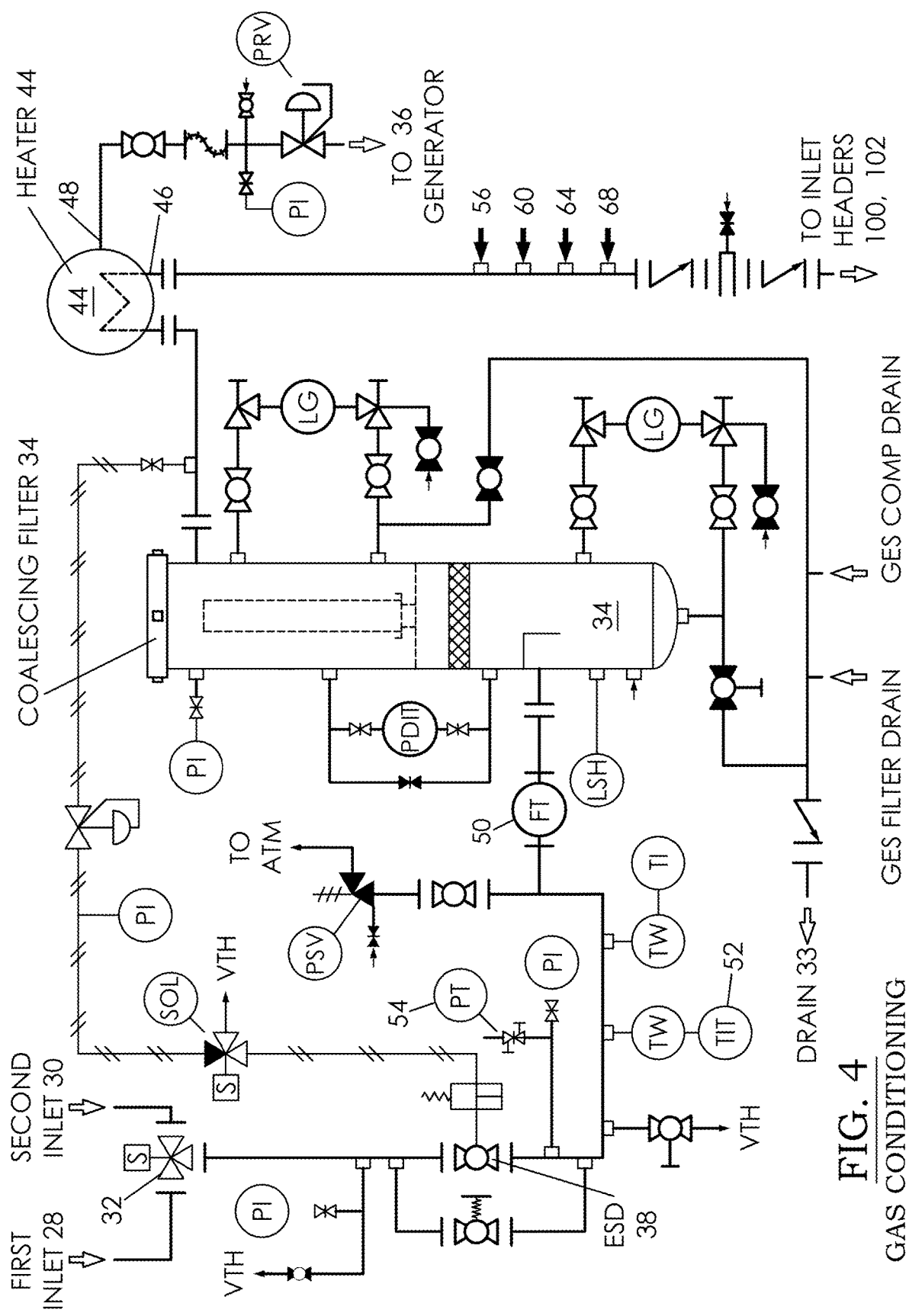
FIG. 4 is a piping schematic of the Natural Gas System of FIG. 1, showing the gas inlet, the coalescing filter, and heater.

FIGS. 1-4 depict an exemplary natural gas system 20 for processing and delivery is used in connection with a natural gas source (not shown) which typically comprises, but is not limited to, a natural gas well or a natural gas pipeline. Raw source natural gas (not shown) is produced by the source. The natural gas processing system 20 comprises a mobile platform 22 that can be transported to the natural gas source. The mobile platform 22 is typically a trailer or a skid, but is not limited to these structures. The mobile platform 22 can be any structure capable of receiving and mounting equipment and of being transported to the site of the natural gas source. FIGS. 1 and 2 show a trailer mobile platform 22, with an enclosure 24, comprising a box trailer with access doors and a system control room 26.

The natural gas enters the system through a natural gas inlet 28, connected in fluid communication with the natural gas source. Optionally, the natural gas inlet includes a first natural gas inlet 28 and a second natural gas inlet 30. A three-way valve 32 is connected in fluid communication with the first 28 and second 30 natural gas inlets, so as to selectively connect either one of the first 28 and second 30 natural gas inlets to the natural gas system 20. A liquid drain 33 is juxtaposed with the mobile platform 22 for discharging liquid contaminants, especially water, from the natural gas processing system 20. The liquid drain 33 is also found on major components throughout the system.

A contaminant filter 34 is mounted on the mobile platform 22 and is connected in fluid communication with the source natural gas inlets 28, 30. The contaminant filter is connected to the liquid drain 33, and removes contaminants from the natural gas. The contaminant filter typically is a coalescing filter 34, and allows passage of the natural gas through the filter.

A generator 36 is mounted on the mobile platform 22, and is powered by the natural gas. This is to be considered non-limiting, as any fuel could power the generator 36. The generator 36 supplies process electricity to the natural gas system 20.

An emergency shutdown valve 38 is connected in fluid communication with the natural gas inlet 28, 30. A process control 42 is operatively connected to the natural gas processing system 20, the generator 36, and the emergency shutdown valve 38. The process control 42 controls the natural gas processing system 20. The process control 42 receives data from the plurality of temperature, pressure, gas, and flow measuring sensors operatively connected to the process control. At least one emergency shutdown control 40 is operatively connected to the emergency shutdown valve 38 and to the process control 42. The emergency shutdown control 40 and valve 38 is monitored by the process control 42.

The process control 42 includes at least a central processor, a memory, and input and output interface connections (not shown). The input interface is typically a keyboard to receive commands from an operator. The output interface is typically a monitor to display system parameters. Input data is received from instruments, sensors, and detectors throughout the system. The sensors and detectors are connected by cables to the process control 42, although wireless connections is an option. Input data comprise temperature, pressure, liquid levels, and flow at various critical points of the system. Input data further comprise electrical voltage and current. Control logic is programmed to monitor the entire process and is able to provide operator ease of use and real time process status updates.

A heater 44 is mounted on the mobile platform 22, and is connected downstream and in fluid communication with the coalescing filter 34, for heating the natural gas. The heater 44 has two outlets. A first heater outlet 46 conveys natural gas to the end users, as described hereinbelow. A second heater outlet 48 conveys natural gas to the generator 36, to power the generator.

An inlet flow sensor 50 is connected in fluid communication with the natural gas inlets 28,30, and upstream of the coalescing filter 34, to measure the flow rate of the natural gas entering the system. The inlet flow sensor 50 is operatively connected to the process control 42.

An inlet temperature sensor 52 is connected in fluid communication with the natural gas inlets 28, 30, and upstream of the coalescing filter 34, to measure the temperature of the natural gas entering the system. The inlet temperature sensor 52 is operatively connected to the process control 42.

An inlet pressure sensor 54 is connected in fluid communication with the natural gas inlets 28, 30, to measure the pressure of the natural gas. The inlet pressure sensor 54 is operatively connected to the process control 42.

An inlet gas sensor 56 is connected in fluid communication with the natural gas inlets 28, 30, the coalescing filter 34, and the heater 44, to measure parameters such as the presence and concentration of various components of the natural gas. The inlet gas sensor 56 is preferably connected to the first heater outlet 46. The inlet gas sensor 56 is operatively connected to the emergency shutdown control 40, to shut down the natural gas system 20 in the event of an emergency. The inlet gas sensor 56 is also operatively connected to the process control 42 to send data to the process control 42.

A gas analyzer 58 is provided to determine the chemical composition of the natural gas. The gas analyzer 58 is operatively connected to the inlet gas sensor 56, to receive data from the inlet gas sensor 56. The gas analyzer 58 is operatively connected to the process control 42 to send data to the process control 42. The gas analyzer 58 is operatively connected to the emergency shutdown control 40, to shut down the natural gas system 20 in the event of an emergency. The gas analyzer 58 is preferably a gas chromatograph, but this is understood to be non-limiting, as any type of gas analyzer can be used.

An inlet H2S sensor 60 is connected in fluid communication with the natural gas inlets 28, 30, the coalescing filter 34, and the heater 44, to measure H2S level in the natural gas. The inlet H2S sensor 60 is preferably connected to the first heater outlet 46. The inlet H2S sensor 60 is operatively connected to the emergency shutdown control 40, to shut down the natural gas system 20, in the event that any H2S parameters should exceed programmed limits.

An H2S analyzer 62 is operatively connected to the inlet H2S sensor 60 to receive data from the inlet H2S sensor 60, and to the process control 42 for sending data to the process control 42. The H2S analyzer 62 is operatively connected to the emergency shutdown control 40, to shut down the natural gas system 20 in the event of an emergency. The H2S analyzer 62 will determine the H2S composition of the natural gas, and will convey the data to the process control 42.

An inlet H2O sensor 64 is connected in fluid communication with the natural gas inlets 28, 30, the coalescing filter 34, and the heater 44, to measure the H2O level in the natural gas. The inlet H2O sensor 64 is preferably connected to the first heater outlet 46. The inlet H2O sensor 64 is operatively connected to the emergency shutdown control 40, to shut down the natural gas system 20 in the event of an emergency.

An H2O analyzer 66 is operatively connected to the inlet H2O sensor 64, to receive data from the inlet H2O sensor 64, and to the process control 42 for sending data to the process control 42. The H2O analyzer 66 is operatively connected to the emergency shutdown control 40, to shut down the natural gas system 20 in the event that moisture levels should exceed programmed limits. The H2O analyzer 66 will determine the H2O composition of the natural gas, and will convey the data to the process control 42.

An inlet odorizer 68 is connected in fluid communication with the natural gas inlets 28, 30, the coalescing filter 34, and the heater 44. The inlet odorizer 68 is preferably connected to the first heater outlet 46 for odorizing the natural gas. The inlet odorizer 68 is operatively connected to the process control 42 to convey the data to the process control 42.

Figure 5:
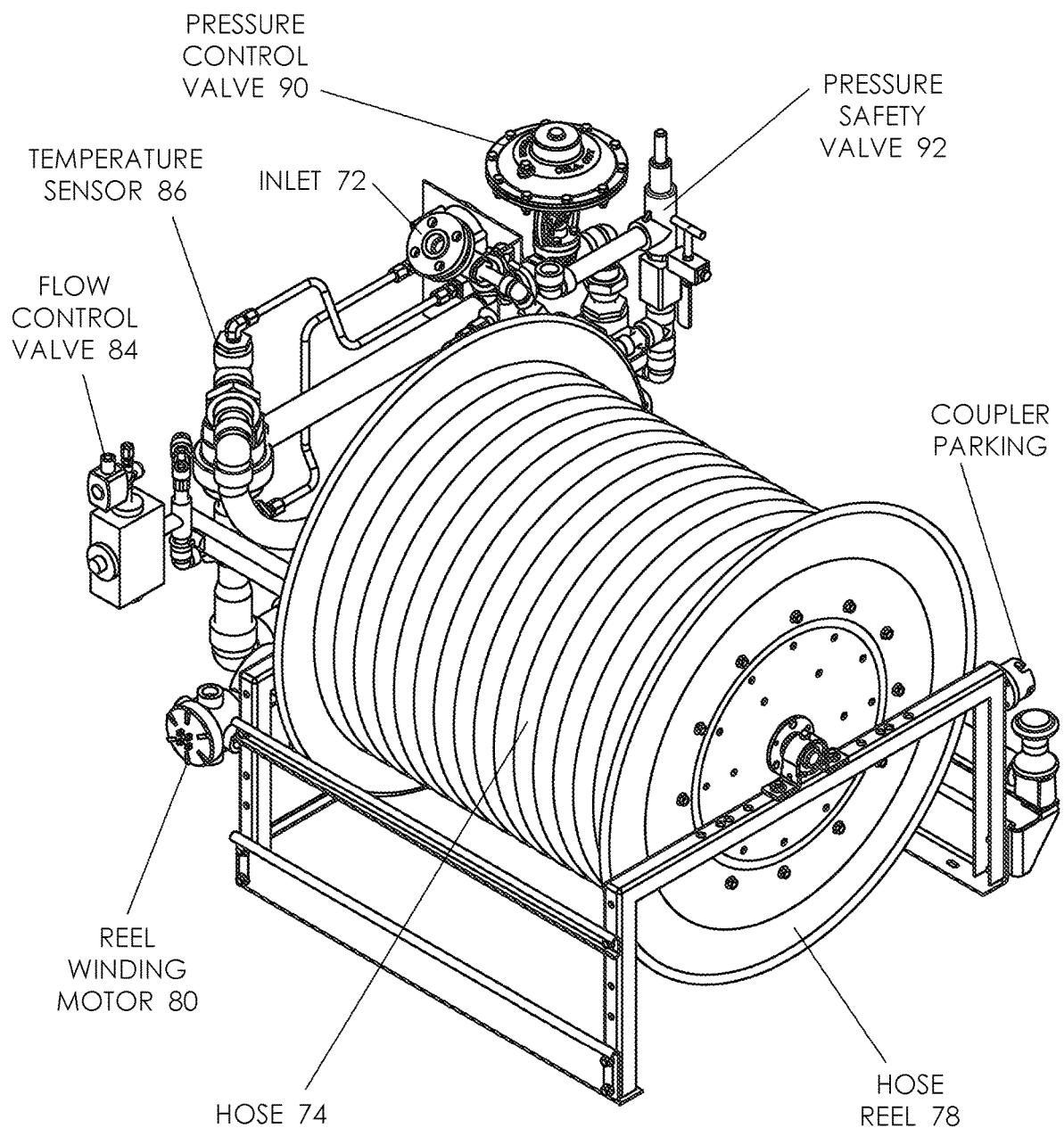
FIG. 5 is a perspective view of a hose reel assembly of the Natural Gas System of FIG. 1.
Figure 6:
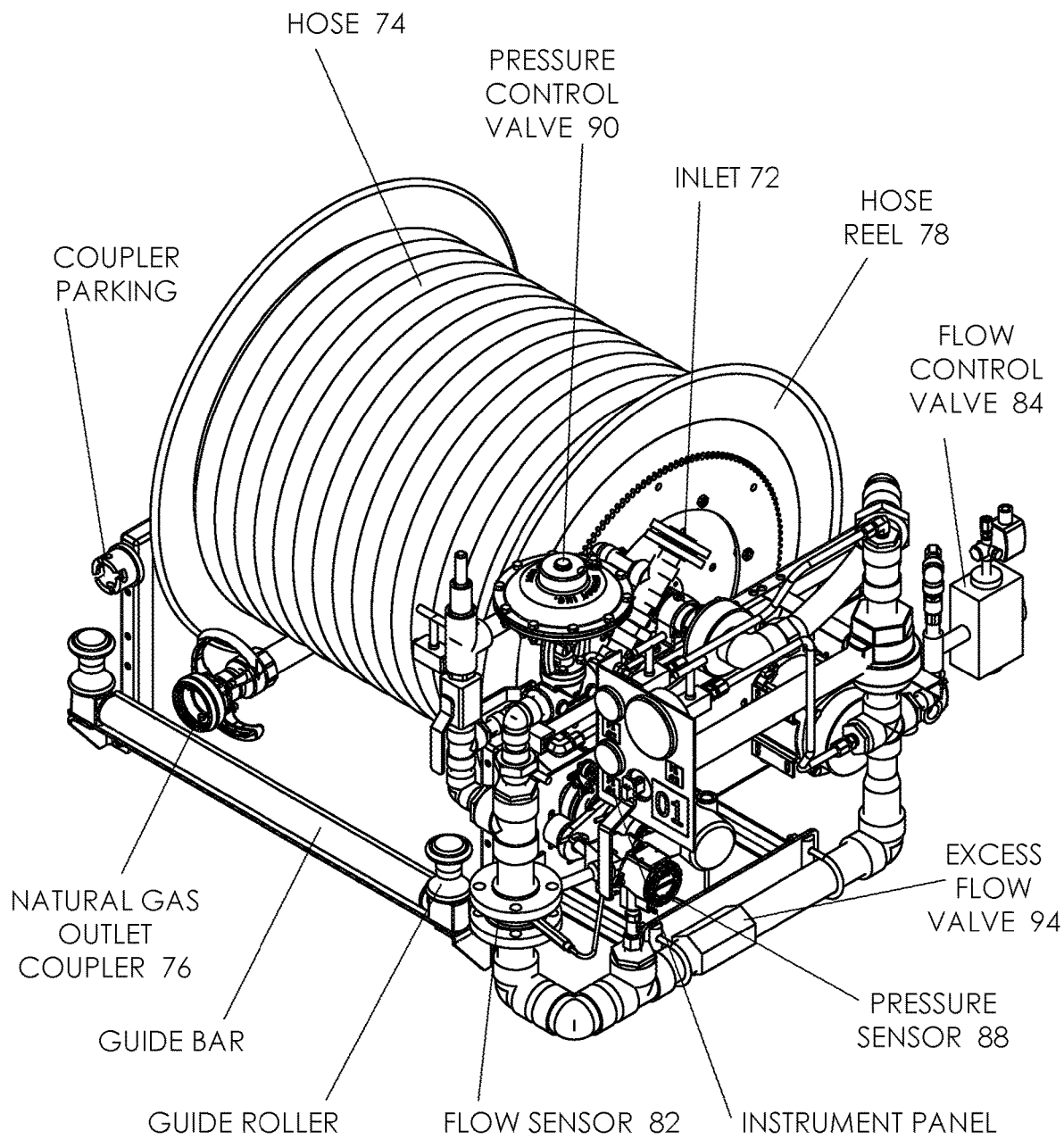
FIG. 6 is another perspective view of the hose reel assembly of FIG. 5.
Figure 7:
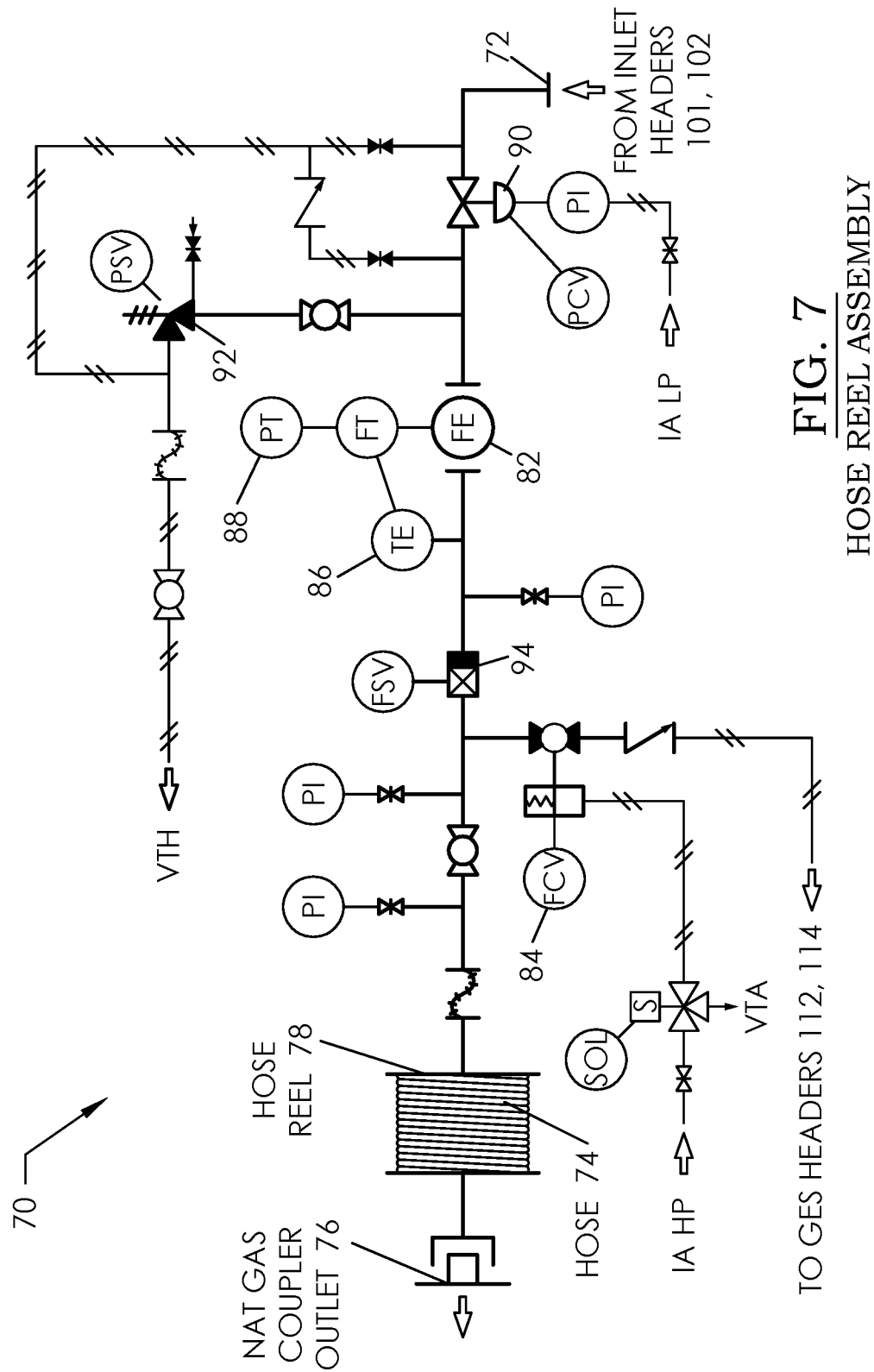
FIG. 7 is a piping schematic of the Natural Gas System of FIG. 1, showing the hose reel assembly.

Referring now to FIGS. 5-7, a plurality of hose reel assemblies 70 are mounted on the mobile platform 22. Each one of the plurality of hose reel assemblies 70 is connected in fluid communication with the natural gas inlets 28, 30. A hose reel assembly inlet 72, admits natural gas. Each one of the hose reel assemblies 70 includes a hose 74 connected in fluid communication with the hose reel assembly 70. A natural gas outlet 76 is connected in fluid communication with the hose 74. The natural gas outlet 76 is typically a dry-break coupler 76, and is adapted for connection to a truck or fuel tank. A hose reel 78, driven by a reel winding motor 80, is provided for winding the hose 74.

Each hose reel assembly 70 has an outlet flow sensor 82 connected in fluid communication with the hose reel assembly 70. The outlet flow sensor 82 measures the flow rate of natural gas through the hose reel assembly 70. The outlet flow sensor 82 is operatively connected to the process control 42. A flow control valve 84 is connected in fluid communication with the hose reel assembly 70, and to the GES, as will be described below. The flow control valve 84 is operatively connected to the outlet flow sensor 82 and to the process control 42.

Each hose reel assembly 70 has an outlet temperature sensor 86 connected in fluid communication with the hose reel assembly 70. The outlet temperature sensor 86 measures the temperature of natural gas in the hose reel assembly 70. The outlet temperature sensor 86 is operatively connected to the emergency shutdown control 40, to shut down the natural gas system 20 in the event of an emergency. The outlet temperature sensor 60 is operatively connected to the process control 42 to send data to the process control 42.

Each hose reel assembly 70 has an outlet pressure sensor 88 connected in fluid communication with the hose reel assembly 70. The outlet pressure sensor 88 measures the pressure of natural gas in the hose reel assembly 70. The outlet pressure sensor 88 is operatively connected to the process control 42. An outlet pressure control valve 90 is connected in fluid communication with the hose reel assembly 70. The outlet pressure control valve 90 is operatively connected to the outlet pressure sensor 88 to receive data from the outlet pressure sensor 88, and to the process control 42 to send data to the process control 42.

Each hose reel assembly 70 has an outlet pressure safety valve 92 connected in fluid communication with the hose reel assembly 70, to relieve gas pressure in excess of a predetermined safety limit. Each hose reel assembly 70 has an excess flow valve 94 connected in fluid communication with the hose reel assembly 70. The excess flow valve 94 limits the flow of natural gas in an emergency.

Figure 8:
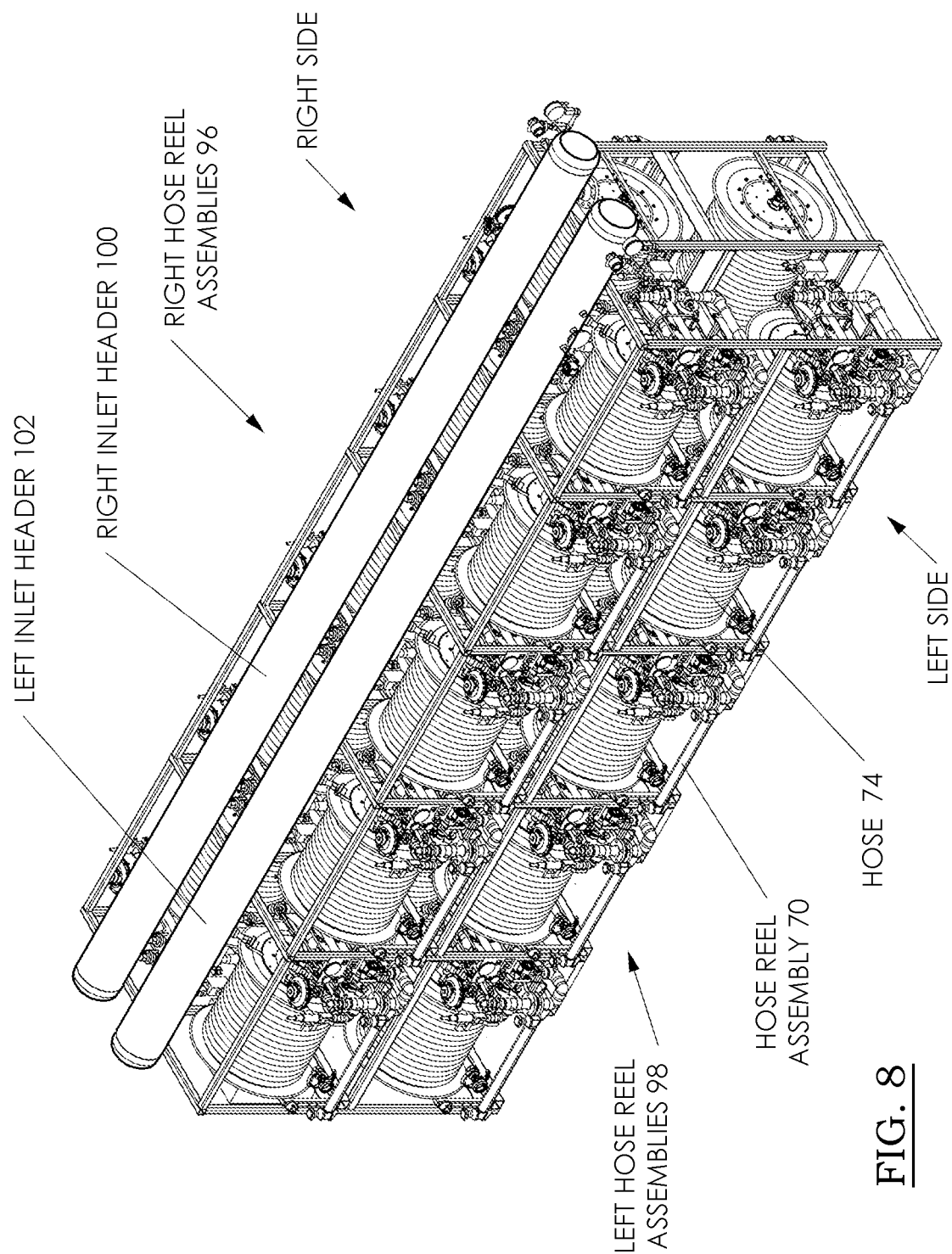
FIG. 8 is a left side perspective view of a plurality of hose reel assemblies of the Natural Gas System of FIG. 1.
Figure 9:
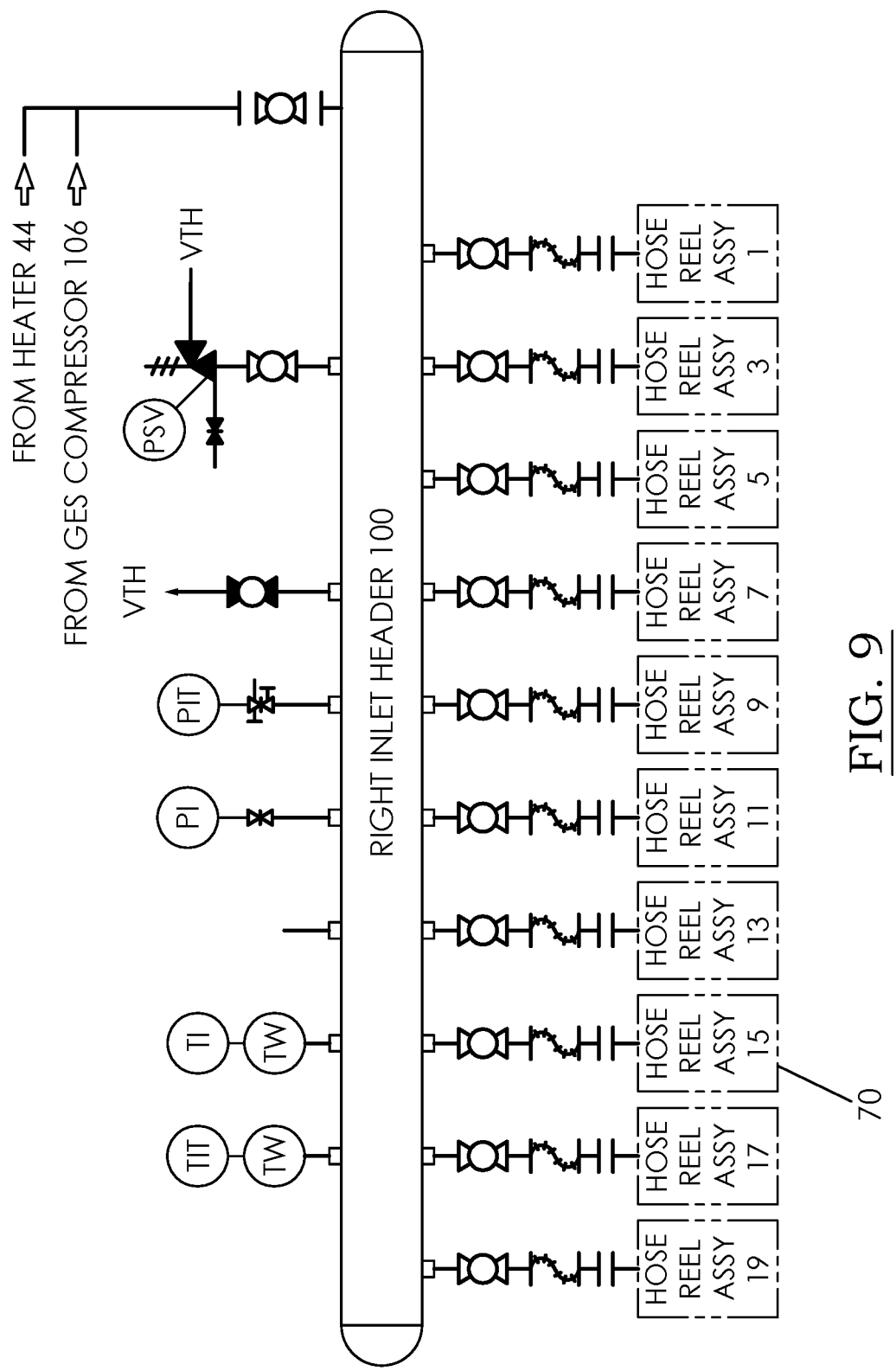
FIG. 9 is a piping schematic of the Natural Gas System of FIG. 1, showing the right side gas supply inlet header.
Figure 10:
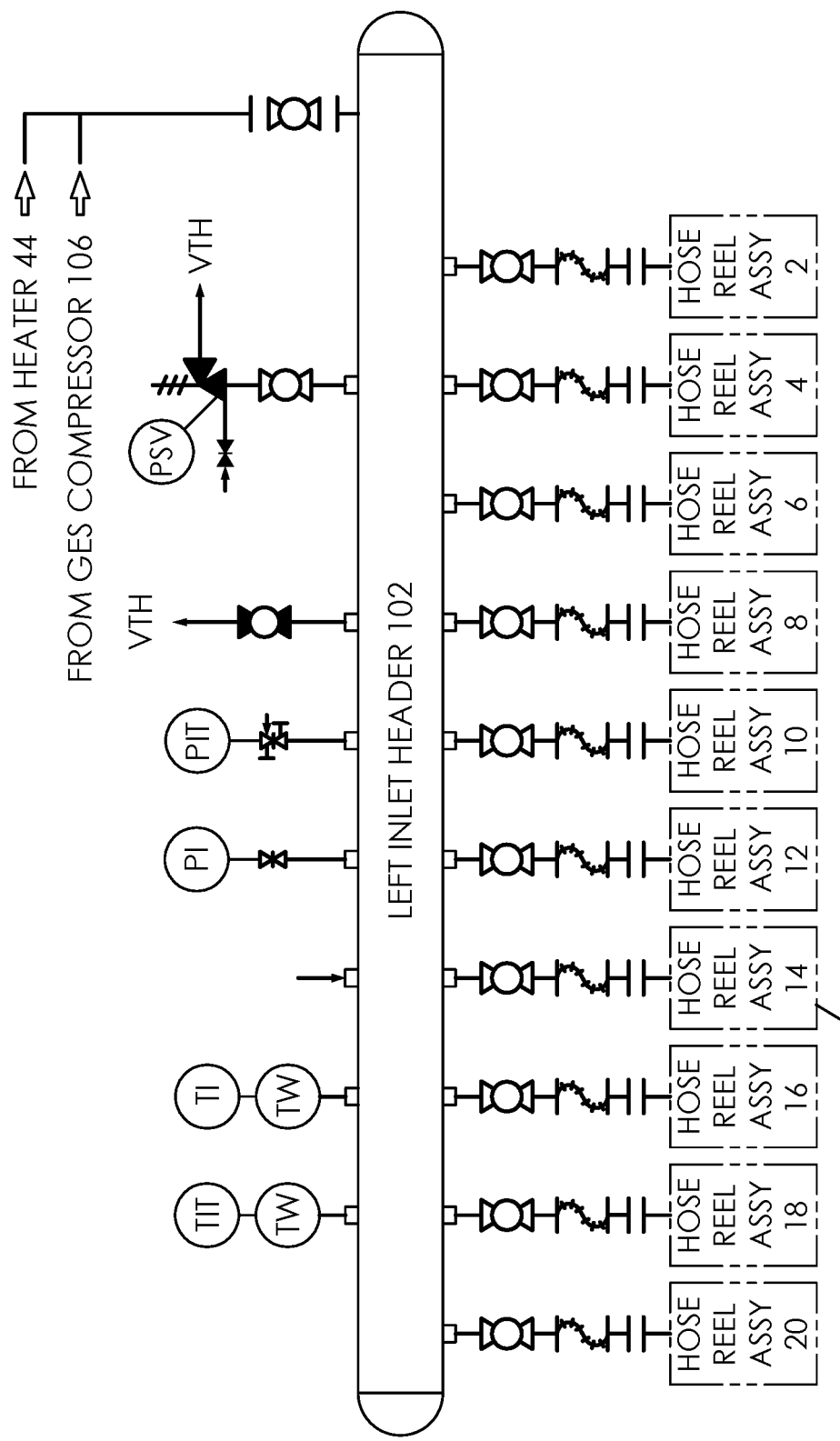
FIG. 10 is a piping schematic of the Natural Gas System of FIG. 1, showing the left side gas supply inlet header.

Turning now to FIGS. 8, 9, and 10, the plurality of hose reel assemblies 70 are mounted in banks on the right and left sides of the mobile platform (platform not shown). The right-hand bank 96 includes odd-numbered hose reel assemblies 1-19. The left-hand bank 98 includes even-numbered hose reel assemblies 2-20. Above the right-hand bank is a right inlet header 100 conveying gas from the heater 44 to the odd-numbered hose reel assemblies 1-19. Above the left-hand bank is a left inlet header 102 conveying gas from the heater 44 to the even-numbered hose reel assemblies 2-20.

Figure 11:
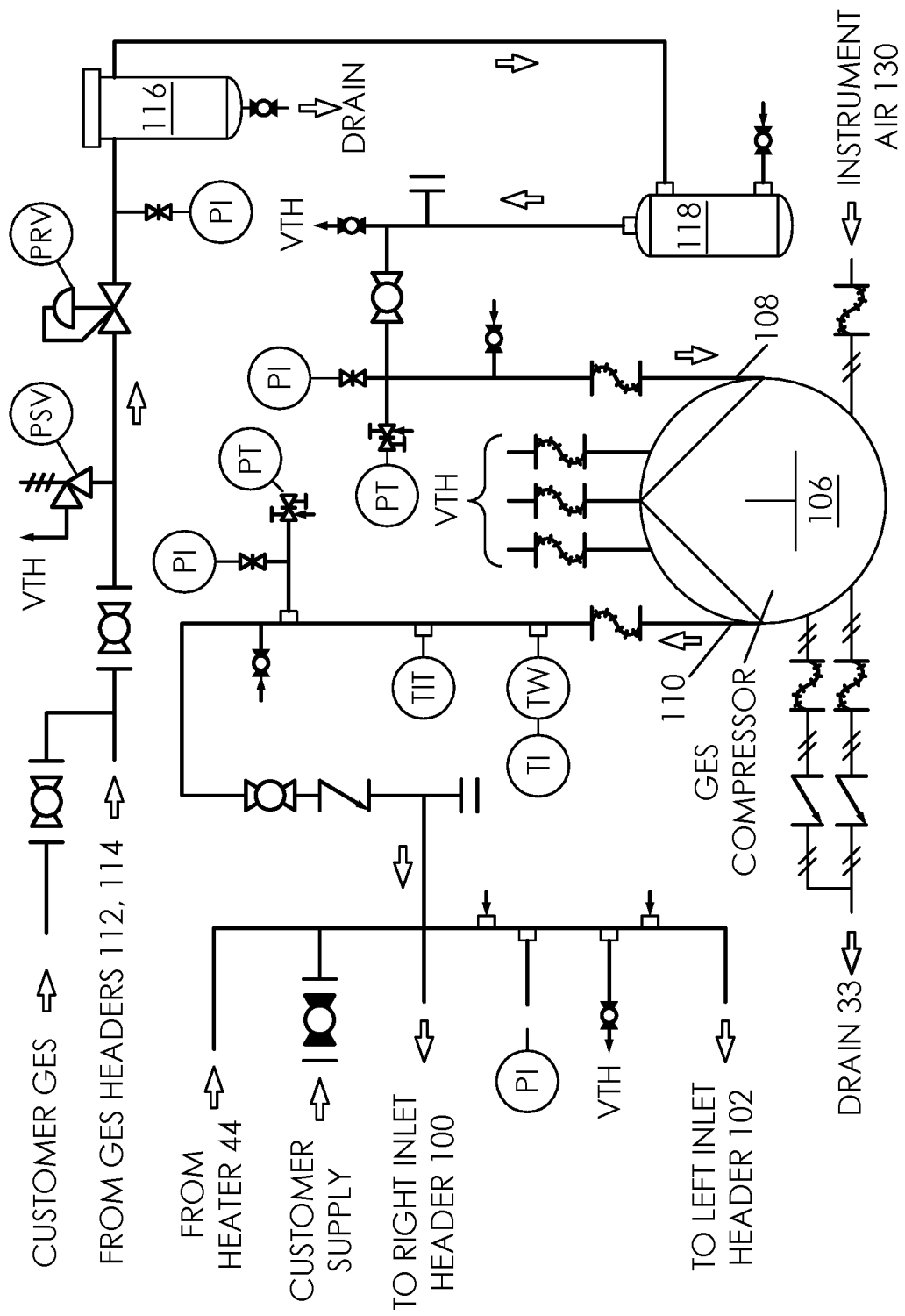
FIG. 11 is a piping schematic of the Natural Gas System of FIG. 1, showing the gas evacuation system.
Figure 12:
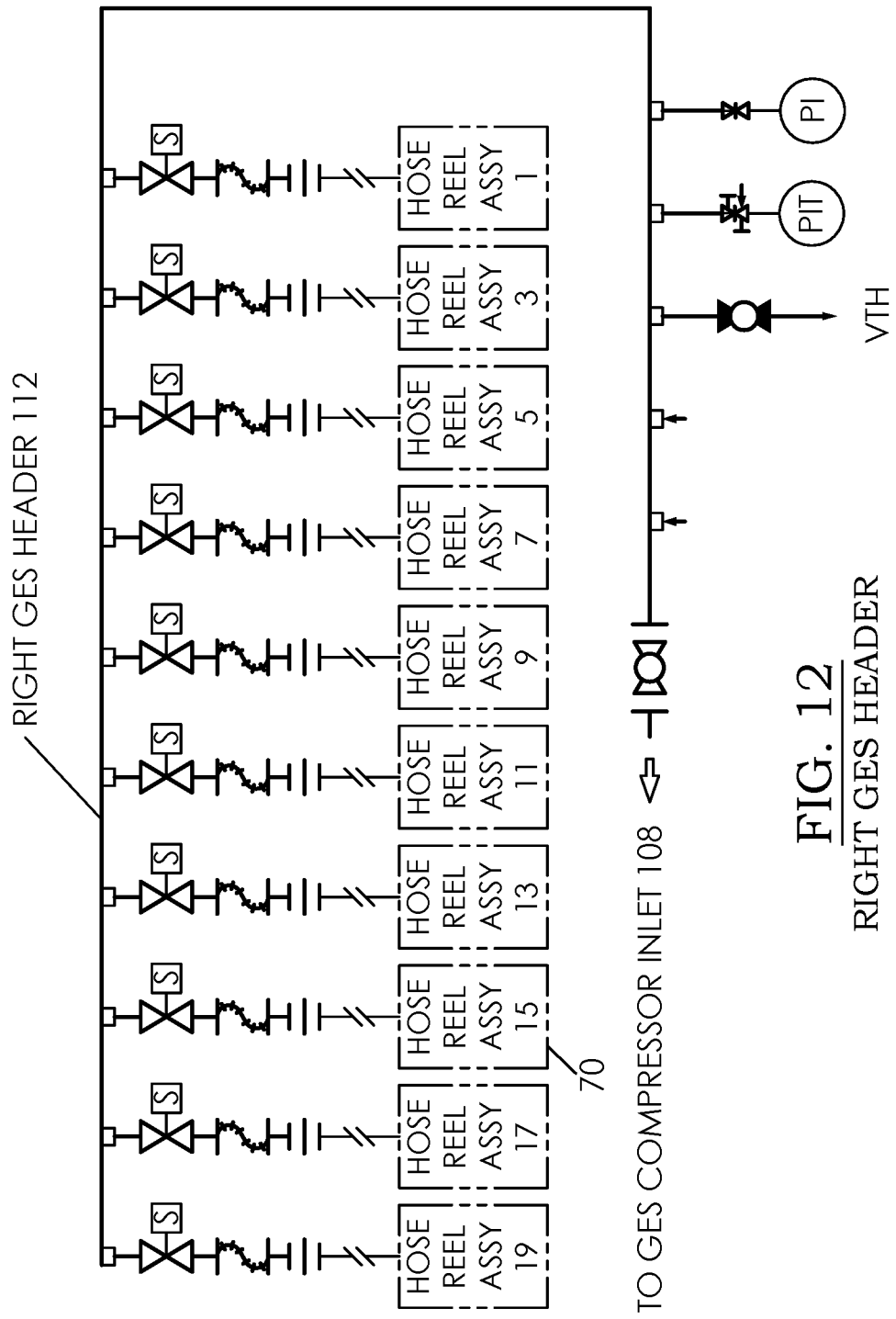
FIG. 12 is a piping schematic of the Natural Gas System of FIG. 1, showing the right side GES header.
Figure 13:
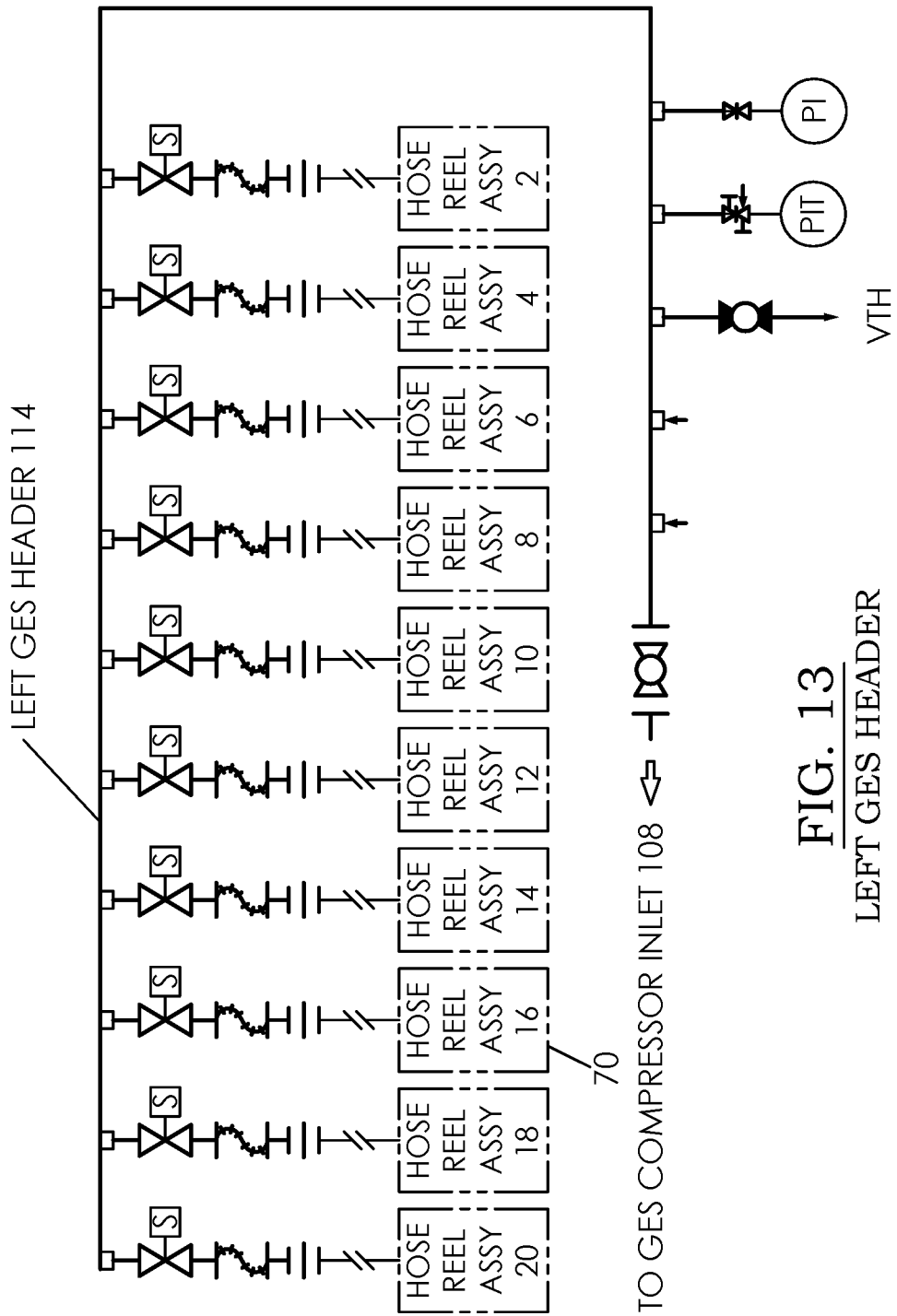
FIG. 13 is a piping schematic of the Natural Gas System of FIG. 1, showing the left side GES header.
Figure 14:
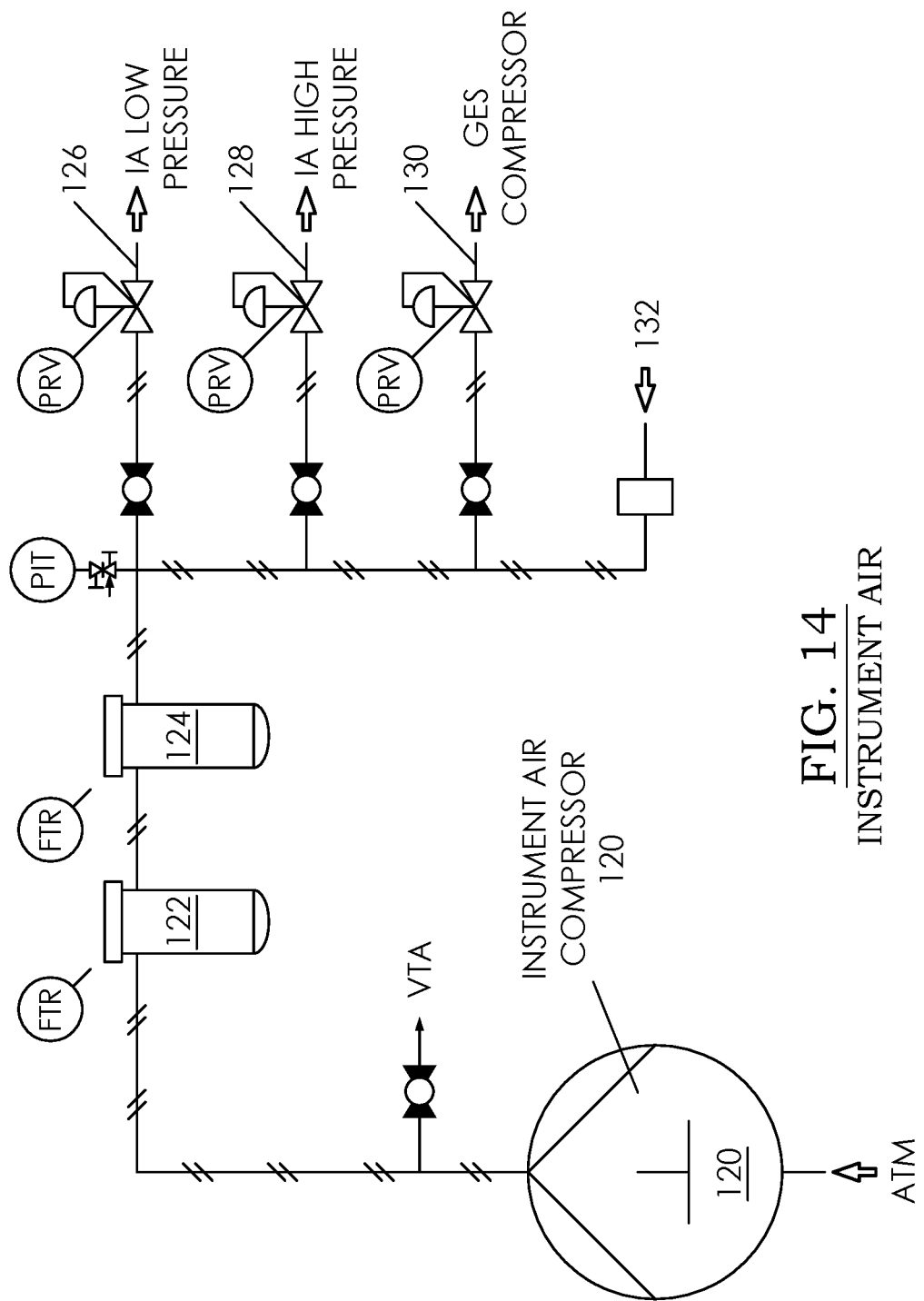
FIG. 14 is a piping schematic of the Natural Gas System of FIG. 1, showing the instrument air supply system.

Referring now to FIGS. 11-13, a gas evacuation system (GES) 104 is mounted on the mobile platform 22. The gas evacuation system 104 has a GES compressor 106 connected in fluid communication with the hose reel assemblies 70. The gas evacuation system 104 pressurizes the hose reel assemblies 70. In normal operation, if gas pressure in any hose reel assembly 70 should decrease below a predetermined lower limit, the GES compressor 106 will boost pressure from the GES compressor outlet 110 through the right 100 and left 102 inlet headers, to complete the filling job. The gas evacuation system 104 also removes gas from the hose reel assemblies 70 in the event of an emergency, such as a gas leak from a hose. The GES 104 is thus an important safety feature to preclude or extinguish a fire. The gas evacuation system 104 is operatively connected to the flow control valve 84, to the emergency shutdown control 40, and to the process control 42.

The gas evacuation system 104, includes GES headers connected in fluid communication with the hose reel assemblies 70, and to the GES compressor inlet 108. A right GES header 112 is connected to the right hose reel assemblies 96. A left GES header 114 is connected to the left hose reel assemblies 98. In the event of an emergency, the GES compressor 106 will draw gas from the hose reel assemblies 70 through the right 112 and left 114 GES headers.

The gas evacuation system 104, in addition to emergency use, functions during normal operation to remove natural gas from a single hose 74 or plurality of hoses. At times, it is advantageous to reduce gas pressure partially or completely from the hoses 74 in between stages or during extended down times. In the course of fueling one or more trucks, the GES 104 will preclude the need for blowing down and purging the hose assemblies 70. The disclosed technology will thereby save time and conserve valuable natural gas.

The gas evacuation system 104, includes a first GES filter 116, and a second GES filter 118. The filters 116, 118 remove contaminants from gas entering the GES compressor 106.

An air compressor 120 is mounted on the mobile platform 22, for instrument air to operate pneumatically actuated valves. Compressed air is supplied through first 122 and second 124 air filters, to three outlets. A low pressure outlet 126 is regulated to about 30 psig. A high pressure outlet 128 is regulated to about 100 psig. A third compressor outlet 130 is regulated to 130 psig to supply the GES compressor 106. A fourth connection 132 is provided to admit customer-supplied compressed air, if needed.

It will be appreciated that variants of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

PARTS LIST

Natural Gas System for Processing and Delivery

PART
NO. DESCRIPTION
20 natural gas system
22 mobile platform
24 mobile platform enclosure
26 system control room
28 first natural gas inlet
30 second natural gas inlet
32 three-way valve
33 liquid drain
34 coalescing filter
36 generator
38 emergency shutdown valve
40 emergency shutdown control
42 process control
44 heater
46 first heater outlet
48 second heater outlet
50 inlet flow sensor
52 inlet temperature sensor
54 inlet pressure sensor
56 inlet gas sensor
58 gas analyzer
60 inlet H2S sensor
62 H2S analyzer
64 inlet H2O sensor 66 H2O analyzer
68 inlet odorizer
70 hose reel assembly
72 hose reel assembly inlet
74 hose
76 natural gas outlet
78 hose reel
80 reel winding motor
82 outlet flow sensor
84 flow control valve
86 outlet temperature sensor
88 outlet pressure sensor
90 outlet pressure control valve
92 outlet pressure safety valve
94 excess flow valve
96 right hose reel assemblies
98 left hose reel assemblies
100 right inlet header
102 left inlet header
104 gas evacuation system
106 GES compressor
108 GES compressor inlet
110 GES compressor outlet
112 right GES header
114 left GES header
116 first GES filter
118 second GES filter
120 air compressor
122 first air filter
124 second air filter
126 low pressure outlet
128 high pressure outlet
130 third compressor outlet
132 fourth connection The embodiments of the invention in which an exclusive property or privilege is claimed are defined as follows:

1. A natural gas system for processing and delivery, for use in connection with a natural gas source and raw source natural gas produced by the source, the natural gas system comprising:
   a mobile platform adapted for being transported to the natural gas source;
   a source natural gas inlet adapted for being connected in fluid communication with the natural gas source;
   at least one hose reel assembly mounted on the mobile platform, the at least one hose reel assembly being connected in fluid communication with the source natural gas inlet, the at least one hose reel assembly including:
      a hose connected in fluid communication with the at least one hose reel assembly;
      a natural gas outlet connected in fluid communication with the hose;
   a liquid drain juxtaposed with the mobile platform for discharging liquid contaminants from the natural gas system; and
   a gas evacuation system mounted on the mobile platform, the gas evacuation system being connected in fluid communication with the at least one hose reel assembly, the gas evacuation system being adapted to remove gas from the at least one hose reel assembly in the event of an emergency.

2. The natural gas system of claim 1, further comprising a generator juxtaposed with the mobile platform, for supplying process electricity.

3. The natural gas system of claim 2, wherein the generator is mounted on the mobile platform, and is powered by natural gas.

4. The natural gas system of claim 2, further comprising:
   a process control operatively connected to the natural gas system, to the gas evacuation system and to the generator, for controlling the natural gas system;
   an emergency shutdown valve connected in fluid communication with the source natural gas inlet, the emergency shutdown valve being operatively connected to the process control; and
   an emergency shutdown control operatively connected to the emergency shutdown valve and to the process control.

5. The natural gas system of claim 1, further comprising a contaminant filter mounted on the mobile platform, the contaminant filter being connected in fluid communication with the source natural gas inlet and connected to the liquid drain, so as to remove contaminants from the natural gas, the contaminant filter being adapted for allowing passage of the natural gas therethrough.

6. The natural gas system of claim 5, wherein the contaminant filter further comprises a coalescing filter.

7. The natural gas system of claim 5, further comprising:
   the source natural gas inlet includes a first natural gas inlet and a second natural gas inlet; and
   a three-way valve connected in fluid communication with the first and second natural gas inlets and the contaminant filter, so as to selectively connect a one of the first and second natural gas inlets to the contaminant filter.

8. The natural gas system of claim 4, further comprising:
   an inlet flow sensor connected in fluid communication with the source natural gas inlet, so as to measure a flow rate of the natural gas, the inlet flow sensor being operatively connected to the process control;
   an inlet temperature sensor connected in fluid communication with the source natural gas inlet, so as to measure the temperature of the natural gas, the inlet temperature sensor being operatively connected to the process control; and
   an inlet pressure sensor connected in fluid communication with the source natural gas inlet, so as to measure the pressure of the natural gas, the inlet pressure sensor being operatively connected to the process control.

9. The natural gas system of claim 4, further comprising:
   an inlet gas sensor connected in fluid communication with the source natural gas inlet, the inlet gas sensor being operatively connected to the emergency shutdown control, so as to shut down the natural gas system in the event of an emergency; and
   a gas analyzer to analyze the composition of the natural gas, the gas analyzer being operatively connected to the inlet gas sensor and to the process control for sending data to the process control, the inlet gas analyzer being operatively connected to the emergency shutdown control, so as to shut down the natural gas system in the event of an emergency.

10. The natural gas processing system of claim 4, further comprising:
    an inlet H2S sensor connected in fluid communication with the source natural gas inlet, the inlet H2S sensor being operatively connected to the emergency shutdown control, so as to shut down the natural gas system in the event of an emergency; and
    an H2S analyzer operatively connected to the inlet H2S sensor and to the process control for sending data to the process control, the H2S analyzer being operatively connected to the emergency shutdown control, so as to shut down the natural gas system in the event of an emergency.

11. The natural gas processing system of claim 4, further comprising:
an inlet H2O sensor connected in fluid communication with the source natural gas inlet, the inlet H2O sensor being operatively connected to the emergency shutdown control, so as to shut down the natural gas system in the event of an emergency; and
an H2O analyzer operatively connected to the inlet H2O sensor and to the process control for sending data to the process control, the H2O analyzer being operatively connected to the emergency shutdown control, so as to shut down the natural gas system in the event of an emergency.

12. The natural gas processing system of claim 4, further comprising an inlet odorizer connected in fluid communication with the source natural gas inlet, the inlet odorizer being operatively connected to the process control for odorizing the natural gas.

13. The natural gas processing system of claim 1, further comprising a heater mounted on the mobile platform, the heater being connected in fluid communication with the natural gas inlet, for heating the natural gas.

14. The natural gas system for processing and delivery of claim 4, wherein the at least one hose reel assembly further comprises a plurality of hose reel assemblies, wherein each hose reel assembly includes:
a motor-driven hose reel, for winding the hose;
an outlet flow sensor connected in fluid communication with the hose reel assembly, so as to measure the flow rate of natural gas through the hose reel assembly, the outlet flow sensor being operatively connected to the process control;
a flow control valve connected in fluid communication with the hose reel assembly and the gas evacuation system, the flow control valve being operatively connected to the outlet flow sensor and to the process control;
an outlet temperature sensor connected in fluid communication with the hose reel assembly, so as to measure the temperature of natural gas in the hose reel assembly, the outlet temperature sensor being operatively connected to the process control;
an outlet pressure sensor connected in fluid communication with the hose reel assembly, so as to measure the pressure of natural gas in the hose reel assembly, the outlet pressure sensor being operatively connected to the process control; and
an excess flow valve connected in fluid communication with the hose reel assembly, so as to limit the flow of natural gas in an emergency.

15. The natural gas system of claim 14, wherein the gas evacuation system further comprises a GES compressor connected in fluid communication with the hose reel assemblies, the gas evacuation system being adapted to pressurize the hose reel assemblies, the gas evacuation system being adapted to remove gas from the hose reel assemblies in the event of an emergency, the gas evacuation system being operatively connected to the process control.

16. The natural gas system for processing and delivery of claim 1, wherein the natural gas system further comprises an air compressor juxtaposed with the mobile platform, for supplying instrument air.

17. A natural gas system for processing and delivery, for use in connection with a natural gas source and raw source natural gas produced by the source, the natural gas system comprising:
a mobile platform adapted for being transported to the natural gas source;
a source natural gas inlet adapted for being connected in fluid communication with the natural gas source;
a liquid drain juxtaposed with the mobile platform for discharging liquid contaminants from the natural gas processing system;
a contaminant filter mounted on the mobile platform, the contaminant filter being connected in fluid communication with the source natural gas inlet and connected to the liquid drain, so as to remove contaminants from the natural gas, the contaminant filter being adapted for allowing passage of the natural gas therethrough;
an emergency shutdown valve connected in fluid communication with the source natural gas inlet;
a process control operatively connected to the natural gas processing system, and to the emergency shutdown valve, for controlling the natural gas processing system;
at least one emergency shutdown control operatively connected to the emergency shutdown valve and to the process control;
a heater mounted on the mobile platform, the heater being connected in fluid communication with the source natural gas inlet, for heating the natural gas;
at least one hose reel assembly mounted on the mobile platform, the at least one hose reel assembly being connected in fluid communication with the natural gas inlet, the at least one hose reel assembly including:
a hose connected in fluid communication with the at least one hose reel assembly;
a natural gas outlet connected in fluid communication with the hose;
an inlet flow sensor connected in fluid communication with the source natural gas inlet, so as to measure the flow rate of the natural gas, the inlet flow sensor being operatively connected to the process control;
an inlet temperature sensor connected in fluid communication with the source natural gas inlet, so as to measure the temperature of the natural gas, the inlet temperature sensor being operatively connected to the process control;
an inlet pressure sensor connected in fluid communication with the source natural gas inlet, so as to measure the pressure of the natural gas, the inlet pressure sensor being operatively connected to the process control; and
a gas evacuation system mounted on the mobile platform, the gas evacuation system having a GES compressor connected in fluid communication with the at least one hose reel assembly, the gas evacuation system being adapted to pressurize the at least one hose reel assembly, the gas evacuation system being adapted to remove gas from the at least one hose reel assembly in the event of an emergency, the gas evacuation system being operatively connected to the process control.

18. The natural gas system of claim 17, further comprising a generator mounted on the mobile platform, and powered by the natural gas, for supplying process electricity.

19. The natural gas system for processing and delivery of claim 17, wherein the contaminant filter further comprises a coalescing filter.

20. The natural gas system of claim 17, further comprising:

an emergency shutdown valve connected in fluid communication with the source natural gas inlet, the emergency shutdown valve being operatively connected to the process control.

21. The natural gas system of claim 20, further comprising:
an inlet gas sensor connected in fluid communication with the source natural gas inlet, the inlet gas sensor being operatively connected to the at least one emergency shutdown control, so as to shut down the natural gas system in the event of an emergency; and
a gas analyzer to analyze the composition of the natural gas, the gas analyzer being operatively connected to the inlet gas sensor and to the process control for sending data to the process control, the inlet gas analyzer being operatively connected to the at least one emergency shutdown control, so as to shut down the natural gas system in the event of an emergency.

22. The natural gas processing system of claim 20, further comprising:
an inlet H2S sensor connected in fluid communication with the source natural gas inlet, the inlet H2S sensor being operatively connected to the at least one emergency shutdown control, so as to shut down the natural gas system in the event of an emergency; and
an H2S analyzer operatively connected to the inlet H2S sensor and to the process control for sending data to the process control, the H2S analyzer being operatively connected to the at least one emergency shutdown control, so as to shut down the natural gas system in the event of an emergency.

23. The natural gas processing system of claim 20, further comprising:
an inlet H2O sensor connected in fluid communication with the source natural gas inlet, the inlet H2O sensor being operatively connected to the at least one emergency shutdown control, so as to shut down the natural gas system in the event of an emergency; and
an H2O analyzer operatively connected to the inlet H2O sensor and to the process control for sending data to the process control, the H2O analyzer being operatively connected to the at least one emergency shutdown control, so as to shut down the natural gas system in the event of an emergency.

24. The natural gas processing system of claim 17, further comprising an inlet odorizer connected in fluid communication with the source natural gas inlet, the inlet odorizer being operatively connected to the process control for odorizing the natural gas.

25. The natural gas system for processing and delivery of claim 17, wherein the at least one hose reel assembly further comprises a plurality of hose reel assemblies, wherein each hose reel assembly includes:
a motor-driven hose reel, for winding the hose;
an outlet flow sensor connected in fluid communication with the hose reel assembly, so as to measure the flow rate of natural gas through the hose reel assembly, the outlet flow sensor being operatively connected to the process control;
a flow control valve connected in fluid communication with the hose reel assembly and the gas evacuation system, the flow control valve being operatively connected to the outlet flow sensor and to the process control;
an outlet temperature sensor connected in fluid communication with the hose reel assembly, so as to measure the temperature of natural gas in the hose reel assembly, the outlet temperature sensor being operatively connected to the process control;
an outlet pressure sensor connected in fluid communication with the hose reel assembly, so as to measure the pressure of natural gas in the hose reel assembly, the outlet pressure sensor being operatively connected to the process control; and
an excess flow valve connected in fluid communication with the hose reel assembly, so as to limit the flow of natural gas in an emergency.

26. The natural gas system of claim 17, further comprising:
the source natural gas inlet includes a first natural gas inlet and a second natural gas inlet;
a three-way valve connected in fluid communication with the first and second natural gas inlets and the contaminant filter, so as to selectively connect a one of the first and second natural gas inlets to the contaminant filter.

27. The natural gas system for processing and delivery of claim 17, wherein the natural gas system further comprises an air compressor juxtaposed with the mobile platform, for supplying instrument air.

28. A natural gas system for processing and delivery, for use in connection with a natural gas source and raw source natural gas produced by the source, the natural gas system comprising:
a mobile platform adapted for being transported to the natural gas source;
a source natural gas inlet adapted for being connected in fluid communication with the natural gas source;
a liquid drain juxtaposed with the mobile platform for discharging liquid contaminants from the natural gas processing system;
a contaminant filter mounted on the mobile platform, the contaminant filter being connected in fluid communication with the source natural gas inlet and connected to the liquid drain, so as to remove contaminants from the natural gas, the contaminant filter being adapted for allowing passage of the natural gas therethrough;
a generator mounted on the mobile platform, and powered by the natural gas, to supply process electricity to the natural gas system;
an emergency shutdown valve connected in fluid communication with the source natural gas inlet;
a process control operatively connected to the natural gas processing system, and to the generator, and to the emergency shutdown valve, for controlling the natural gas processing system;
at least one emergency shutdown control operatively connected to the emergency shutdown valve and to the process control;
a plurality of hose reel assemblies mounted on the mobile platform, each one of the plurality of hose reel assemblies being connected in fluid communication with the source natural gas inlet, each one of the hose reel assemblies including:
a hose connected in fluid communication with the hose reel assembly;
a natural gas outlet connected in fluid communication with the hose;
a motor-driven hose reel, for winding the hose;
an outlet flow sensor connected in fluid communication with the hose reel assembly, so as to measure the flow rate of natural gas through the hose reel assembly, the outlet flow sensor being operatively connected to the process control;

a flow control valve connected in fluid communication with the hose reel assembly, the flow control valve being operatively connected to the outlet flow sensor and to the process control;

an outlet temperature sensor connected in fluid communication with the hose reel assembly, so as to measure the temperature of natural gas in the hose reel assembly, the outlet temperature sensor being operatively connected to the process control;

an outlet pressure sensor connected in fluid communication with the hose reel assembly, so as to measure the pressure of natural gas in the hose reel assembly, the outlet pressure sensor being operatively connected to the process control; and an excess flow valve connected in fluid communication with the hose reel assembly, so as to limit the flow of natural gas in an emergency;

a heater mounted on the mobile platform, the heater being connected in fluid communication with the source natural gas inlet, for heating the natural gas;

an inlet flow sensor connected in fluid communication with the source natural gas inlet, so as to measure the flow rate of the natural gas, the inlet flow sensor being operatively connected to the process control;

an inlet temperature sensor connected in fluid communication with the source natural gas inlet, so as to measure the temperature of the natural gas, the inlet temperature sensor being operatively connected to the process control;

an inlet pressure sensor connected in fluid communication with the source natural gas inlet, so as to measure the pressure of the natural gas, the inlet pressure sensor being operatively connected to the process control; and a gas evacuation system mounted on the mobile platform, the gas evacuation system having a GES compressor connected in fluid communication with the hose reel assemblies, the gas evacuation system being adapted to pressurize the hose reel assemblies, the gas evacuation system being adapted to remove gas from the hose reel assemblies in the event of an emergency, the gas evacuation system being operatively connected to the process control.

29. The natural gas system for processing and delivery of claim 28, wherein the contaminant filter further comprises a coalescing filter.

30. The natural gas system of claim 28, further comprising:

an inlet gas sensor connected in fluid communication with the source natural gas inlet, the inlet gas sensor being operatively connected to the at least one emergency shutdown control, so as to shut down the natural gas system in the event of an emergency;

a gas analyzer to analyze the composition of the natural gas, the gas analyzer being operatively connected to the inlet gas sensor and to the process control for sending data to the process control, the inlet gas analyzer being operatively connected to the at least one emergency shutdown control, so as to shut down the natural gas system in the event of an emergency;

an inlet H2S sensor connected in fluid communication with the source natural gas inlet, the inlet H2S sensor being operatively connected to the at least one emergency shutdown control, so as to shut down the natural gas system in the event of an emergency;

an H2S analyzer operatively connected to the inlet H2S sensor and to the process control for sending data to the process control, the H2S analyzer being operatively connected to the at least one emergency shutdown control, so as to shut down the natural gas system in the event of an emergency;

an inlet H2O sensor connected in fluid communication with the source natural gas inlet, the inlet H2O sensor being operatively connected to the at least one emergency shutdown control, so as to shut down the natural gas system in the event of an emergency; and an H2O analyzer operatively connected to the inlet H2O sensor and to the process control for sending data to the process control, the H2O analyzer being operatively connected to the at least one emergency shutdown control, so as to shut down the natural gas system in the event of an emergency.

31. The natural gas system for processing and delivery of claim 28, wherein the natural gas system further comprises an air compressor mounted on the mobile platform, for instrument air.

32. The natural gas system of claim 28, further comprising:

the source natural gas inlet includes a first natural gas inlet and a second natural gas inlet; and a three-way valve connected in fluid communication with the first and second natural gas inlets and the contaminant filter, so as to selectively connect a one of the first and second natural gas inlets to the contaminant filter.

33. The natural gas processing system of claim 28, further comprising an inlet odorizer connected in fluid communication with the source natural gas inlet, the inlet odorizer being operatively connected to the process control for odorizing the natural gas.

34. A method for processing and delivery of natural gas, for use in connection with a natural gas source and raw source natural gas produced by the source, the method comprising:

adapting a mobile platform for transporting to the natural gas source;

connecting a source natural gas inlet in fluid communication with the natural gas source;

mounting at least one hose reel assembly on the mobile platform, and connecting the at least one hose reel assembly in fluid communication with the source natural gas inlet;

connecting a hose in fluid communication with the at least one hose reel assembly;

connecting a natural gas outlet in fluid communication with the hose;

juxtaposing a liquid drain with the mobile platform;

mounting a gas evacuation system on the mobile platform, connecting the gas evacuation system in fluid communication with the at least one hose reel assembly;

discharging liquid contaminants from the natural gas processing system with the liquid drain; and removing gas from the at least one hose reel assembly with the gas evacuation system, in the event of an emergency.

* * * * *